(12) United States Patent
Jemes et al.

(10) Patent No.: US 7,703,124 B2
(45) Date of Patent: Apr. 20, 2010

(54) SYSTEM AND METHOD FOR IMPLEMENTING A PRIVATE VIRTUAL BACKBONE ON A COMMON NETWORK INFRASTRUCTURE

(75) Inventors: Brian L. Jemes, Moscow, ID (US); John M. Brawn, San Jose, CA (US); Farid Filsoof, Bournemouth (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1420 days.

(21) Appl. No.: 11/094,989

(22) Filed: Mar. 31, 2005

(65) Prior Publication Data

US 2006/0230431 A1 Oct. 12, 2006

(51) Int. Cl.
*H04L 9/00* (2006.01)
(52) U.S. Cl. ............... 726/1; 726/2; 726/3; 709/225
(58) Field of Classification Search ............. 726/1–3; 709/225
See application file for complete search history.

(56) References Cited

U.S. PATENT DOCUMENTS

| | | | | |
|---|---|---|---|---|
| 5,953,338 A | * | 9/1999 | Ma et al. .............. | 370/395.21 |
| 6,768,743 B1 | * | 7/2004 | Borella et al. ............ | 370/401 |
| 7,003,287 B2 | * | 2/2006 | Roeder ................ | 455/417 |
| 7,058,973 B1 | * | 6/2006 | Sultan .................. | 726/12 |
| 7,437,162 B1 | * | 10/2008 | Zhang et al. ............ | 455/445 |
| 2001/0042213 A1 | * | 11/2001 | Jemes et al. ............. | 713/201 |
| 2002/0099823 A1 | * | 7/2002 | Jemes et al. ............. | 709/225 |
| 2003/0188001 A1 | * | 10/2003 | Eisenberg et al. ......... | 709/229 |
| 2004/0047340 A1 | * | 3/2004 | Ruckstuhl et al. ......... | 370/352 |
| 2005/0232273 A1 | * | 10/2005 | Suzuki ................. | 370/392 |
| 2006/0120366 A1 | * | 6/2006 | Jayasenan et al. ......... | 370/389 |

* cited by examiner

*Primary Examiner*—Carl Colin (57) ABSTRACT

A network security system is provided comprising a plurality of network bubbles wherein each bubble includes bubble members configured to transmit and receive data. Bubbles have network security policies that may be enforced by a plurality of network control point devices. The system further includes a private virtual backbone configured to interconnect the plurality of network control points connected to known bubbles. The privacy of the private virtual backbone is maintained by an inter-bubble device and/or set of two network control points. The inter-bubble device and set of control points enforce the network security policies of any connected bubble and relay data packets between address spaces. The private virtual backbone may operate in private address space. The system also includes an instance-specific virtual backbone that interconnects only bubble partitions from the same network bubble, thus simplifying the enforcement of a network security policy.

35 Claims, 5 Drawing Sheets

SYSTEM AND METHOD FOR IMPLEMENTING A PRIVATE VIRTUAL BACKBONE ON A COMMON NETWORK INFRASTRUCTURE

BACKGROUND

1. Field of the Invention

The present invention relates particularly to systems and methods for providing network security and efficiency, and more particularly to systems and methods for implementing a private network infrastructure.

2. Description of the Related Art

Corporate electronic networks are susceptible to unauthorized use and network attacks. In an effort to prevent such attacks or break-ins, corporations often use network firewalls or other security measures. Generally, the resulting protected network allows for unrestricted connectivity between known users or devices within the firewall. Users or devices from outside the firewall are restricted in their connectivity with the protected network. For example, a company-employee may be able to access any or all electronic documents or internal web sites within the corporate network, inside the firewall, and the employee may even be able to access other public web sites on the Internet or other networks outside of the firewall. However, a trade-partner, customer, or non-employee outside of the firewall may only have limited access, if any, through the firewall to the corporate documents and internal web sites.

The corporate firewall functions to receive, monitor, and re-direct incoming packets of information. Any data that is directed by a device or user to cross the firewall is queried by the firewall devices to ascertain if the data has the appropriate access privileges to continue to its intended destination. Data without the appropriate privileges or sent by an unauthorized user or device will not be forwarded through the firewall. The actual permissions and settings of the firewall are the implementation of the corporate network security policy.

BRIEF SUMMARY

A network security system is provided which includes a plurality of network bubbles that are both known and unknown, wherein each network bubble has at least one bubble member configured to transmit and receive data. Each network bubble also has a network security policy that may be enforced by at least one of a plurality of network control point devices, each located within a network control point. Each of the plurality of network control points is connected to at least one of the plurality of network bubbles. Each network control point device is configured to enforce the network security policy for the network bubble to which it is connected. The network security system further includes a private virtual backbone configured to interconnect the plurality of network control points connected to known network bubbles. The private, or local, nature of the private virtual backbone is maintained by either an inter-bubble device and/or a set of two network control points, each network control point and inter-bubble device acting to enforce the network security policies of any connected network bubble.

A second network security system is provided which includes a plurality of network bubbles that are both known and unknown, wherein each network bubble has at least one bubble member configured to transmit and receive data. Each network bubble also has a network security policy that may be enforced by at least one of a plurality of network control point devices, each located within a network control point. Each of the plurality of network control points is connected to at least one of the plurality of network bubbles. Each network control point device is configured to enforce the network security policy for the network bubble to which it is connected. The network security system further includes an instance-specific virtual backbone that serves to interconnect only network bubble partitions from the same bubble network, thus removing the need for enforcement of a network security policy among involved bubble instance members.

A third network security system is provided which includes a plurality of network bubbles that are both known and unknown, wherein each network bubble has at least one bubble member configured to transmit and receive data. Each network bubble also has a network security policy that may be enforced by at least one of a plurality of network control point devices, each located within a network control point. Each of the plurality of network control points is connected to at least one of the plurality of network bubbles. Each network control point device is configured to enforce the network security policy for the network bubble to which it is connected. The network security system further includes a virtual backbone configured to connect a plurality of network control points to one another, a private virtual backbone also configured to connect a plurality of network control points to one another, a connecting device such as an inter-bubble device or a set of two serially-connected network control points, configured to interconnect the private virtual backbone and the virtual backbone, and a plurality of instance-specific virtual backbones configured to connect a plurality of network bubble partitions from the same network bubble.

BRIEF DESCRIPTION OF THE SEVERAL VIEWS OF THE DRAWINGS

Embodiments of the present invention will now be described, by way of example only, with reference to the following drawings in which.

DETAILED DESCRIPTION

The present invention is described by reference to the associated drawing figures. Identical labels and numbers in multiple drawing figures are meant to represent the same elements in each drawing figure. The following terms are used throughout and, for purposes of construction, such terms shall have the following meanings:

The terms "network bubble" and "bubble instance," unless otherwise specified, are intended to refer to a collection of multiple devices that have unrestricted network access with each other and that share a common network access policy. Network bubbles or bubble instances are partitioned to include at least one partition with multiple partitions allowed.

The term "bubble partition," unless otherwise specified, is intended to refer to a collection of devices within a bubble instance, including bubble boundary devices, that connect to at least one network control point.

The term "bubble boundary," unless otherwise specified, is intended to refer to devices within a network control point that connect to one or more bubble partitions. The bubble boundaries enforce the network security policy for the bubble instance.

The term "bubble member," unless otherwise specified, is intended to refer to a single device within a bubble instance that has unrestricted network connectivity to all other devices within the same bubble instance.

The terms "network access policy" and "network security policy," unless otherwise specified, are intended to refer to the criteria or rules governing movement of data across a bubble boundary.

The term "known bubble," unless otherwise specified, is intended to refer to all bubble instances with known network security policies and source integrity. Known bubbles may include both corporate-controlled network bubbles and other non-corporate controlled network bubbles.

The term "unknown bubble," unless otherwise specified, is intended to refer to any bubble instance that is not known. No assumptions may be made concerning these unknown network bubbles, as their properties are unknown. However, unknown network bubbles obey the general rules of known bubbles: they are partitioned and they may connect to multiple network control points.

The term "network control point," unless otherwise specified, is intended to refer to geographically co-located devices that act to either interconnect bubble partitions, interconnect network control point devices, interconnect network control points, or enforce a network security policy.

The term "inter-bubble device," unless otherwise specified, is intended to refer to a network interface device that is simultaneously a member of more than one bubble instance. An inter-bubble device is like a bubble boundary within a network control point in that both devices enforce the network security policy for each of the bubble instances of which they are members. The difference, of course, is that an inter-bubble device is not within a network control point and, instead of transmitting data packets directly across the device, data packets are relayed from one side of the device to another in a process of packet termination and packet re-initialization.

The term "virtual backbone," unless otherwise specified, is intended to refer to a network that connects multiple network control points having the property of source integrity. The virtual backbone is external to all of the bubble instances and the network control points.

The term "address registry," unless otherwise specified, is intended to refer to a collection of information describing the address ranges of all the known bubble instances connected to a virtual backbone.

The term "private virtual backbone," unless otherwise specified, is intended to refer to a virtual backbone that is connected to other unknown bubble instances through an inter-bubble device. A private virtual backbone has the characteristic that addresses within its address registry need not be global addresses; the limited connection to unknown bubble instances allows for the utilization of local addresses.

The terms "instance-specific virtual backbone" and "instance-specific private virtual backbone," unless otherwise specified, are intended to refer to private and non-private virtual backbones that connect directly to and only to bubble members of the same, known bubble instance. Connections with multiple partitions of the same bubble instance are allowed, but connections with multiple bubble instances are only allowed via either network control points or inter-bubble devices.

Figure 1:
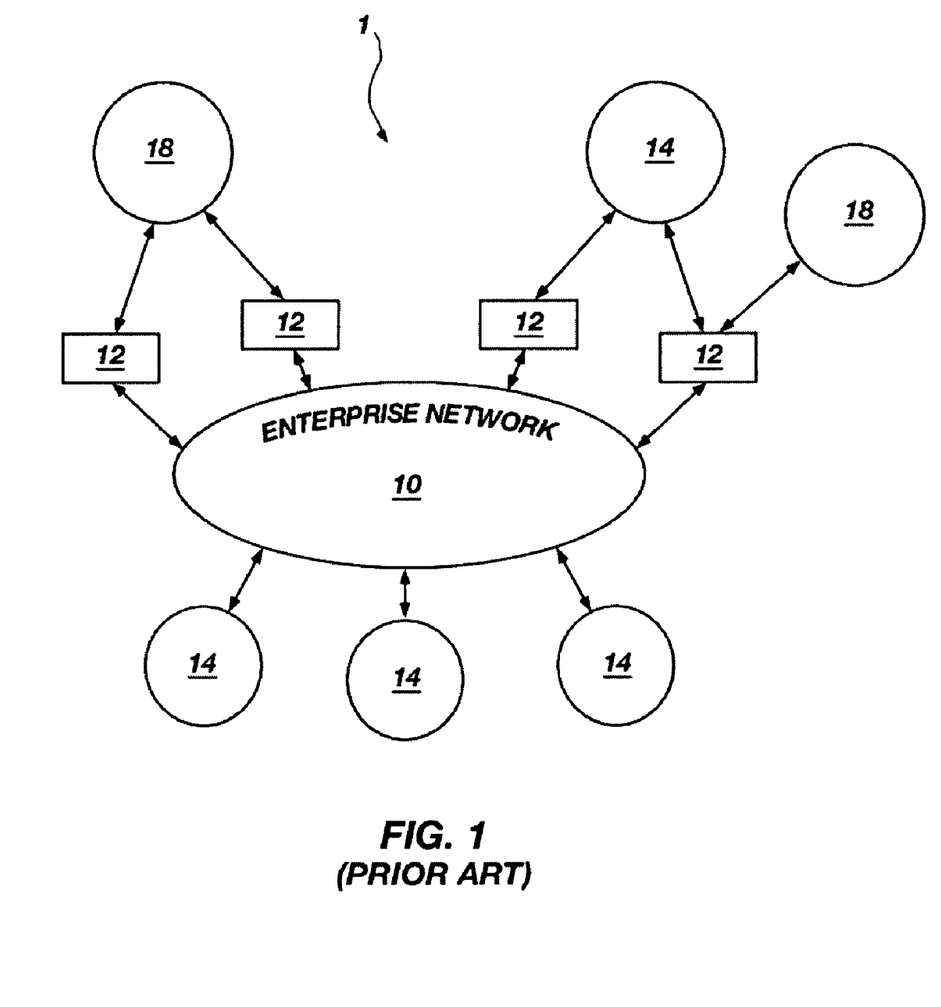
FIG. 1 is a simplified block diagram of a prior art network security system demonstrating a plurality of networks in different geographic locations that are connected to an enterprise network.

With reference now to the illustrative drawings, and particularly to FIG. 1, there is shown a common network security system 1 that involves the creation of firewalls through which data from any unknown or public network must pass. The network security system 1 includes a plurality of known networks 14, each connected to a single enterprise network 10, together representing a business network with geographic diverse offices. The enterprise network 10 is also connected with unknown networks 18 such as the public Internet, or even known networks 14 such as business partner networks, via firewall devices 12. Unknown and known networks 18 and 14 respectively, may be connected to more than one firewall device 12. Thus, a user from an unknown or public network 18 could query the enterprise network 10 through one local firewall device 12, and, as a result of network congestion or rerouting, the response could be directed through a different local firewall device 12.

Another common network security system involves dividing the network space into three categories: internal networks, external networks, and a demilitarized zone ("DMZ"). In this network security system, the network firewall is located between the internal networks, comprising only known networks, and the external networks, comprising both known and unknown networks. The network security policy implemented by the firewall devices allows for restricted communication between the internal and external networks, and unrestricted communication between the internal networks and the DMZ, which includes web servers, email servers and other application servers that require general connectivity with the external network. The DMZ hosts, however, are only permitted independent connectivity with the internal and external networks; they are not permitted to allow "pass-through" connectivity between the internal and the external networks.

Both of these network security systems have several limitations. Both designs allow and even promote the creation of multiple geographically scattered firewall devices. As the number of firewall devices increases, the task of effectively maintaining and standardizing a common network security policy becomes much more difficult and error-prone. Additionally, the fact that a query may pass through one firewall device and a response to that query may pass through another firewall device creates an issue of access coordination between firewall devices. Also, these security systems promote the formation of a single, freely-interconnected enterprise network. If one firewall is breached, the entire enterprise network is at risk.

Yet another network security architecture provides for the creation of multiple levels of security, like concentric rings emanating from a high-security center. Each ring is granted a different level of security, with the outside rings being the most permissive. Firewall devices exist at the boundary of each ring, allowing appropriate information to pass.

A limitation of the concentric rings architecture is that information that must pass to or from the innermost ring must pass through multiple firewall devices. The result is a significant delay in signal throughput. Another drawback is the fact that the inner rings are subject to the access privileges granted by the outermost firewall—the inner rings are not allowed to pass any information that would not be granted access by the outermost firewall.

Figure 2:
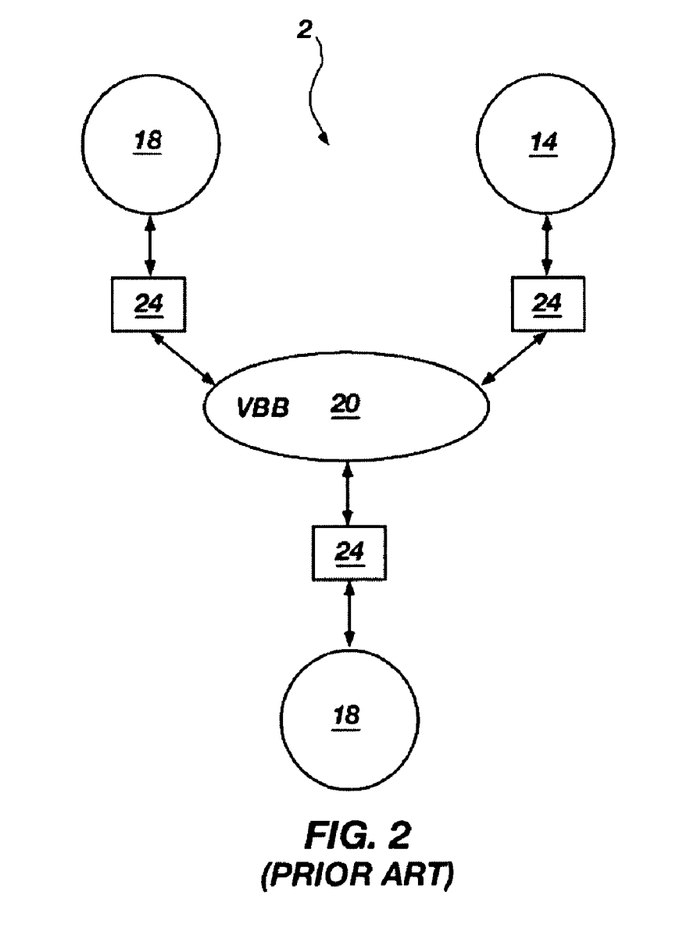
FIG. 2 is a simplified block diagram of a prior art network security system illustrating a plurality of networks connected to a virtual backbone via a plurality of network control points.

A final network security architecture 2 is shown in FIG. 2, and involves the creation of a virtual backbone 20 that would exist outside of both external and internal networks. The virtual backbone 20 is itself a network that interconnects a plurality of known and unknown networks 14 and 18 respectively, via network control points 24. The network control points 24 each include one or more network control point devices that may act as routers with access lists, firewall devices, or any other appropriate device capable of enforcing source integrity, network security policy, and routing functions. The network control point devices effectively control the flow of information to and from the protected internal known networks.

One advantage of using a virtual backbone over other network security architectures is that using a network control point to connect with the virtual backbone allows each connecting network to implement its own security policy utilizing only the network control point devices of the associated network control points. Thus, the virtual backbone security architecture solves several of the problems associated with the other common network security architectures. Problems with enforcing a consistent network security policy over multiple firewalls are reduced because each known network may instead manage their own network control point device without endangering the security of other networks.

Figure 3:
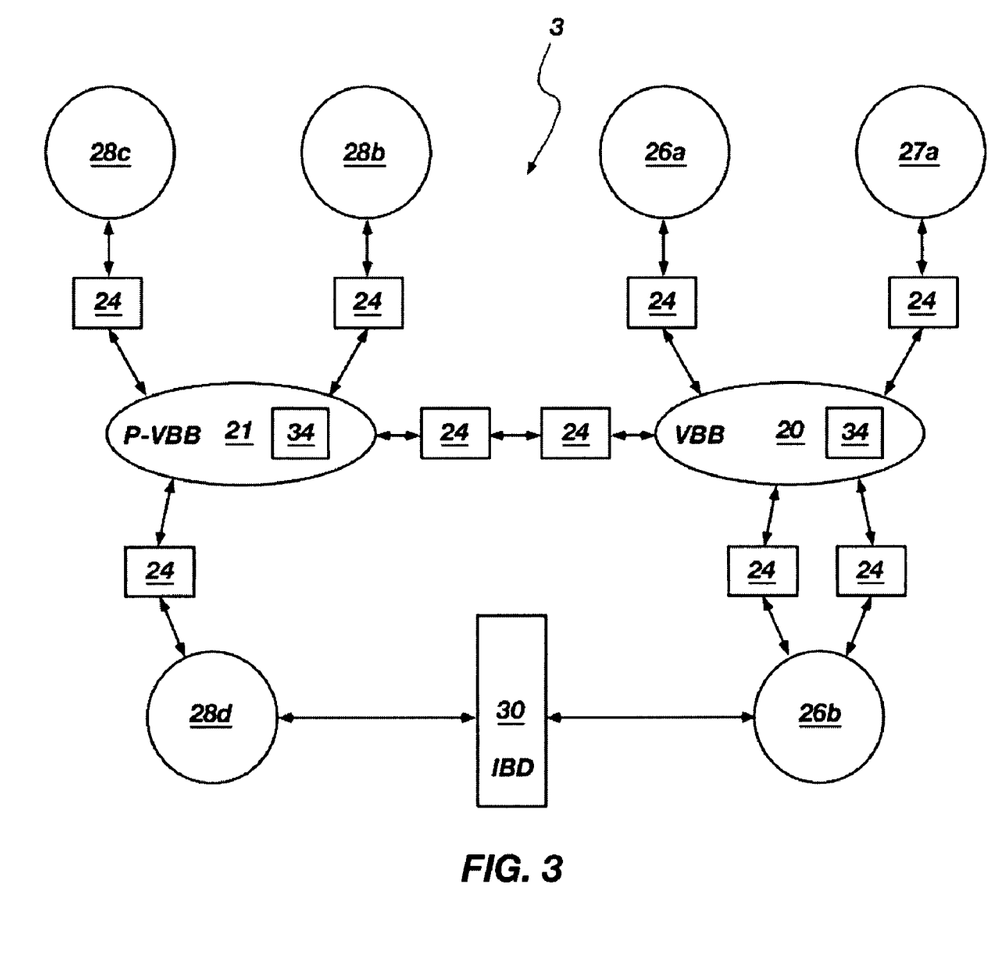
FIG. 3 is a simplified block diagram of a network security system illustrating a private virtual backbone connected to a plurality of known network bubbles via a plurality of network control points and also connected to a global virtual backbone network security system via an inter-bubble device, in accordance with an embodiment of the present invention.

FIG. 3 shows a simplified block diagram of a network security system 3, in accordance with an embodiment of the present invention, having a plurality of known network bubbles 27 and 28, a plurality of unknown network bubbles 26, a plurality of network control points 24, a virtual backbone 20, a private virtual backbone 21, and an inter-bubble device 30. Each of the network bubbles is connected to either the virtual backbone 20 or the private virtual backbone 21 via one or more network control points 24. The bubbles are further partitioned into known network bubbles 27a, 28b, 28c and 28d, and unknown network bubbles 26a and 26b. The inter-bubble device 30 connects two different bubble instances 26b and 28d. Two network control points 24 also act in series to interconnect the virtual backbone 20 and the private virtual backbone 21.

The plurality of known network bubbles 27 and 28 may include independent known network bubbles i.e., network bubbles that are known but not controlled, and known network bubbles that are controlled. The plurality of unknown network bubbles 26 may include networks such as the public Internet or, for example, a partner's network, about which no security assumptions may be made. Bubble members within either known or unknown network bubbles may send data to each other only through the appropriate network control points 24 or inter-bubble device 30, and then only if permitted by the associated network security policy as enforced by the related bubble boundary or inter-bubble device 30. The plurality of network bubbles may be embodied, for example, as an IP network, a wireless network, or any other network technology.

Each bubble member is assigned an address whereby it is known on the virtual backbone to which the bubble member is connected via network control points 24. The address is stored in the virtual backbone address registry 34 wherein the associated bubble member is identified as a member of a particular bubble instance. Accordingly, the plurality of network bubbles may be defined by an address range corresponding to the addresses of the individual bubble members. The address registry 34 may be utilized when constructing the network security policy for a particular network bubble partition.

Each network control point 24, contains one or more network control point devices which act to connect network bubbles to the associated virtual backbone. A network control point device that connects to a network bubble is called a bubble boundary. The bubble boundary devices are utilized to both route data and also enforce the network security policy for known network bubbles 27 and 28. The bubble boundary devices or network control point devices may be implemented by routers with access lists, dedicated network firewall devices, or any other appropriate device capable of enforcing source integrity, network security policy, and routing functions. The bubble boundary devices also act to block data marked as originating from an address that is not part of the valid address range for a particular known network bubble. In this way, a virtual backbone 20 may utilize connected network control points 24 to enforce source address integrity on any external connections.

The virtual backbone 20, is a network that connects to a plurality of network control points 24. It exists outside the network control points 24, and is external to all of the plurality of network bubbles. As such, network bubbles and the virtual backbone utilize separate and independent network infrastructures, thus allowing for the independent maintenance of individual network security policies. The virtual backbone may be implemented using any number of network infrastructures, such as a VPN, an ISP, an ATM, or any other wired or wireless network utilizing protocols such as T1, DS3, or OC-3.

The private virtual backbone 21 is essentially a virtual backbone that does not interact directly with any unknown network bubbles. Instead, it is utilized to connect only known network bubbles. An address registry 34 is utilized by the private virtual backbone 21 to identify associated bubble members within the known network bubbles. Like the virtual backbone 20, it may be implemented using a VPN, an ISP, an ATM, or any other wired or wireless network utilizing protocols such as T1, DS3, or OC-3. The private virtual backbone is also external to all of the plurality of network bubbles and network control points that it interconnects, thus allowing individual network bubbles to maintain their own network security policies through the independent bubble boundary devices. As with virtual backbones, multiple private virtual backbones may exist within the same network security system.

Additionally, the private virtual backbone 21 is separated from other non-controlled network bubbles via either an inter-bubble device 30 or a set of two network control points 24, or both. The inter-bubble device 30 is similar to a bubble boundary device in that it acts to implement the network security policies of any bubble that it inter-connects. However, the inter-bubble device 30 differs from a bubble boundary device in that the inter-bubble device 30 does not actually transmit an identical data packet from one side of the device to the other. Instead, a data packet terminates on one side of the inter-bubble device 30, and then, through a relay system, a new data packet is initiated on the other side of the inter-bubble device 30. The inter-bubble device 30 is in between network sessions.

The set of two network control points 24 serially connecting the private virtual backbone 21 and the virtual backbone 20 function in a manner similar to that of the inter-bubble device 30. Because each network control point 24 comprises network control point devices that enforce the network security policy of the connected network bubbles, each of these two serially connected network control points 24 acts to enforce the network security policy of either the associated private virtual backbone 21 or the associated virtual backbone 20. Hence, two network control points 24 may potentially be serially positioned between any two independent virtual backbones 20 solely connected to known network bubbles, thus creating a private virtual backbone 21.

One advantage of including an inter-bubble device 30 and/or a set of two network control points 24 in a network system is the effective separation of one portion of a network from another. In the context of a private virtual backbone, an inter-bubble device 30 and/or a set of two network control points 24 allows a collection of known network bubbles to remain independent of any unknown network bubble. Communication with an unknown network bubble occurs through either the inter-bubble device 30 or the set of two network control points 24. Furthermore, this allows for the use of local (as opposed to global) addresses in the private virtual backbone 21. In other words, a bubble member in one private virtual backbone 21 could have the same local address as a bubble member in another private virtual backbone 21, and no address collisions would occur. In order for the private virtual backbone 21 to apply this optional local addressing, the inter-bubble device 30 and/or set of two network control points 24 must incorporate some means to translate local address information to global address information, and vice versa. Data that passes between the private virtual backbone 21 and the virtual backbone 20 may carry some form of network or port address translation information. Bubble members attached to a private virtual backbone 21 using private, or local address space will require translation of the related addresses. In this way, a private virtual backbone 21 will be able to both see and be seen using global address space.

The inter-bubble device 30, could be implemented as a web-caching proxy wherein all known network bubbles connected to the private virtual backbone could have web browsers configured to connect to the device. Another example includes an SMTP email relay, allowing emails to be sent in and out of the private virtual backbone. A third example of an inter-bubble device 30 includes a remote access gateway such as an IP security gateway device. Users may tunnel to the device, create an IP sec tunnel from an unknown network bubble, and then terminate their tunnel on the inter-bubble device 30. As a result, all packets inside the tunnel would be able to route through the inter-bubble device 30 and act as if sourced from a known network bubble. Other implementations of an inter-bubble device 30 include, but are not limited to, a SOCKS server (a proxy server without the special caching capabilities of a caching HTTP proxy server), a citrix server, an SSL, a VPN, or an SIP gateway.

Figure 4:
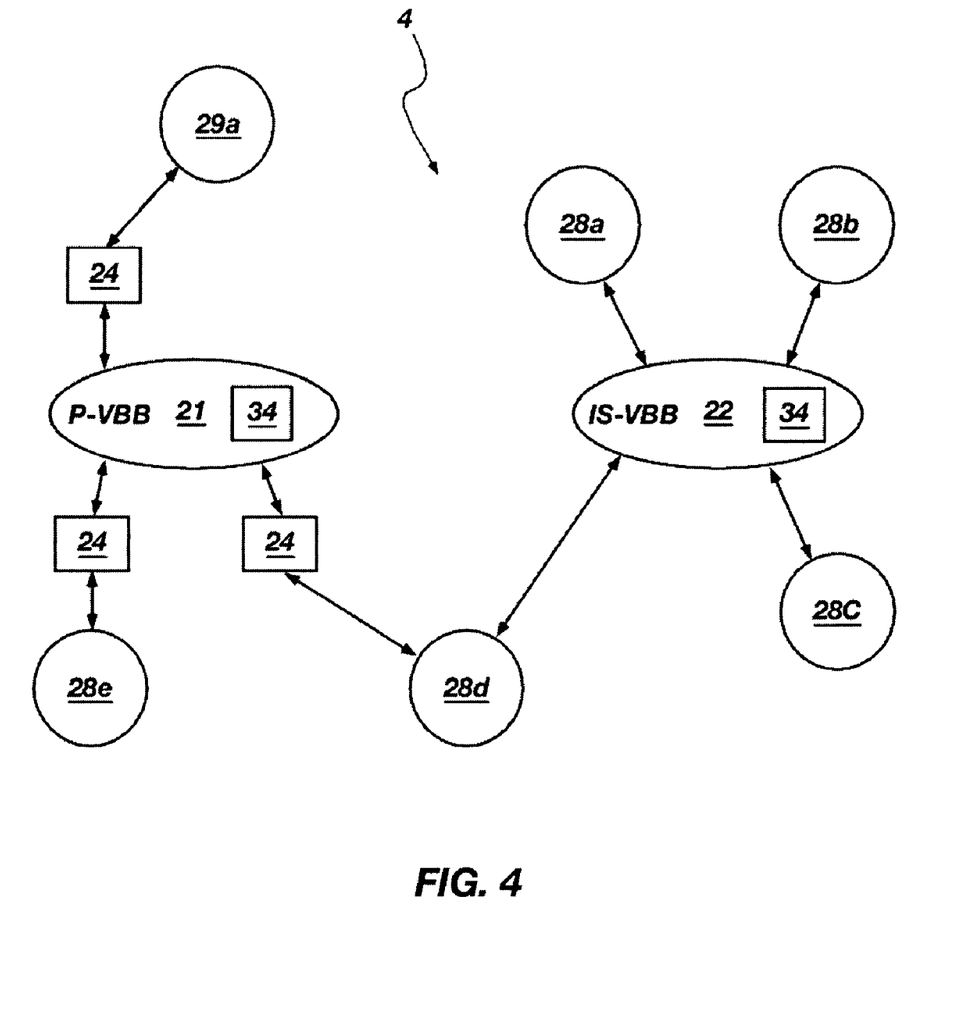
FIG. 4 is a simplified block diagram of a network security system illustrating an instance-specific virtual backbone connected directly to a plurality of bubble partitions of the same bubble instance and to a private virtual backbone that is also connected to a plurality of known network bubbles, in accordance with an embodiment of the present invention.

FIG. 4 is a simplified block diagram of a network security system 4 that includes a plurality of known network bubbles 28 and 29, a plurality of network control points 24, a private virtual backbone 21, and an instance-specific virtual backbone 22, in accordance with an embodiment of the present invention. The network control points 24, and more specifically the bubble boundary devices within the network control points 24, act to connect certain network bubbles with the private virtual backbone 21.

The known network bubbles are herein divided into two distinct bubble instances, 28 and 29. Bubble instance 29 has, for example, one partition, 29a. Bubble instance 28, however, has multiple partitions, represented as 28a, 28b, 28c, 28d, and 28e. By definition, each bubble partition has the same network security policy as its parent bubble instance.

As in FIG. 3, a private virtual backbone 21 exists to connect certain known network bubbles together. Bubble boundary devices within the network control points 24 effectively screen incoming and outgoing data which travels on the private virtual backbone 21 between the known bubble members. An address registry 34 is utilized by the private virtual backbone 21 to identify known bubble members.

No network control points 24 are present between the known network bubble partitions 28a, 28b, 28c, and 28d and the instance-specific virtual backbone 22. This is due to the fact that all bubble partitions connected to the instance-specific virtual backbone 22 are from the same bubble instance, meaning that they share the same network security policy. Thus, network control points 24 are not necessary to screen sent data packets from one bubble partition to another.

Instance-specific virtual backbones 22 are only available to connect bubble partitions from the same bubble instance. In order to enforce this stipulation, the bubble partitions must also all be known bubble partitions. Thus, if the considered bubble partitions are known and from the same bubble instance, then one could reduce the complexity of the network security system and increase throughput by removing the unnecessary network control points 24 and create an instance-specific virtual backbone 22.

Like the private virtual backbone 21, the instance-specific virtual backbone 22 may be implemented using a VPN, an ISP, an ATM, or any other wired or wireless network utilizing protocols such as T1, DS3, or OC-3. The instance-specific virtual backbone 22 is external to all of the plurality of network bubbles. Associated bubble members are identified using an address registry 34. As with virtual backbones, multiple instance-specific virtual backbones 22 may exist within the same network security system.

Figure 5:
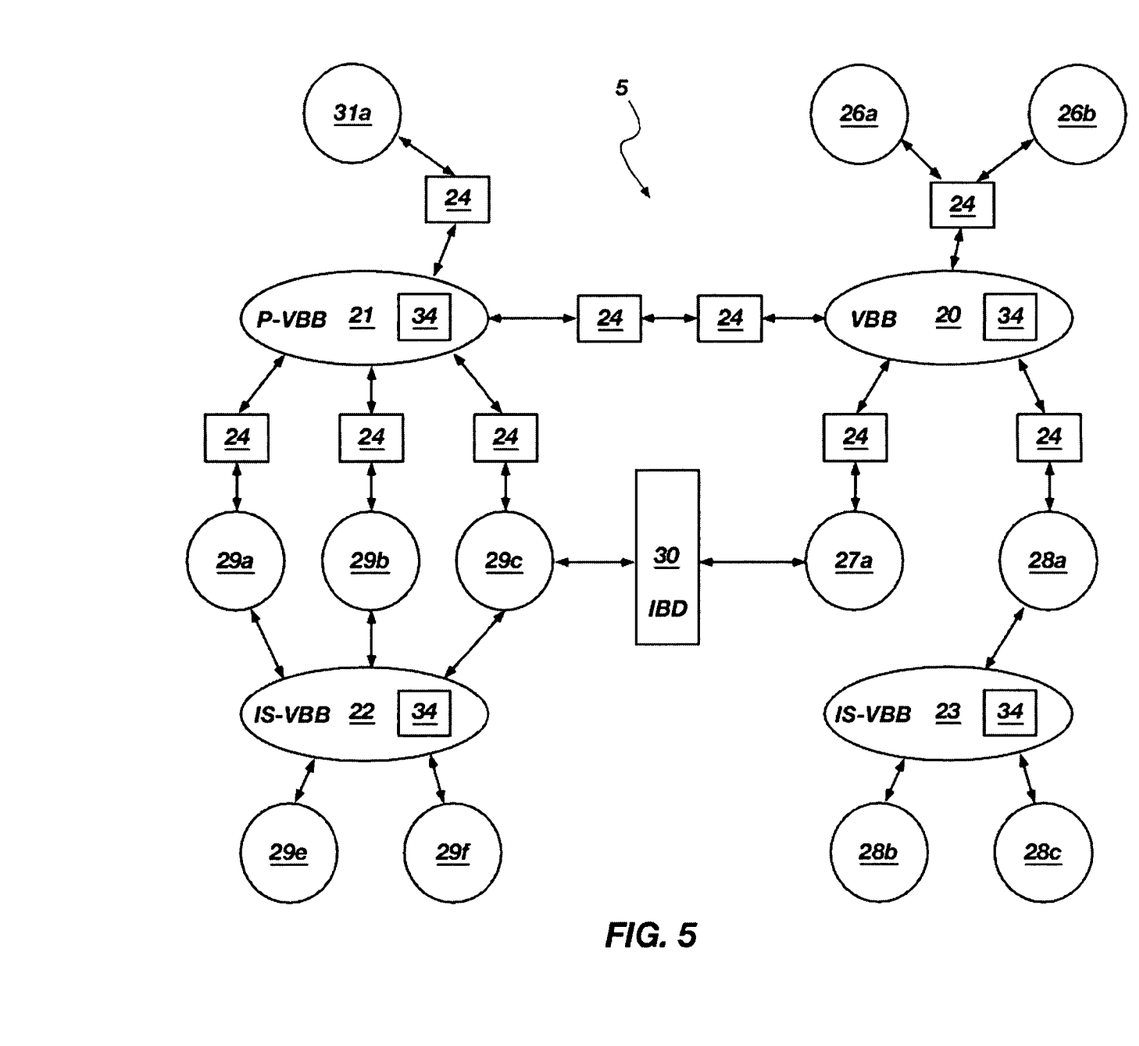
FIG. 5 is a simplified block diagram of a network security system illustrating the function of two instance-specific virtual backbones, in accordance with an embodiment of the present invention.

FIG. 5 is a simplified block diagram of a network security system 5 depicting two instance-specific virtual backbones, in accordance with an embodiment of the present invention. One of the instance-specific virtual backbones 22, is ultimately connected to a private virtual backbone 21. Hence, any bubble member in bubble partitions 29a, 29b, 29c, 29e, and 29f connected to instance-specific virtual backbone 22 may have a local address stored in the address registry 34 of the private virtual backbone 21. Private virtual backbone 21 could also be an instance-specific virtual backbone if it were not connected to two different bubble instances, known bubble partition 31a and known bubble partitions 29a, 29b, and 29c. Hence, private virtual backbone 21 utilizes a plurality of network control points 24 to connect with bubble partitions 31a, 29a, 29b, and 29c. The bubbles 26 are unknown network bubbles partitioned into bubbles 26a and 26b. The bubbles 28 are known network bubbles partitioned 28a, 28b, 28c.

Instance-specific virtual backbone 23 is ultimately connected to virtual backbone 20 through known bubble partition 28a and a network control point 24. However, because the virtual backbone 20 is not private i.e., it connects to an unknown bubble instance, the stored address registry 34 for the bubble partitions connected to virtual backbone 20 and instance-specific virtual backbone 23 will contain global addresses.

The potential local, private address space utilized by private virtual backbone 21 and the global, public address space utilized by virtual backbone 20 are separated and connected by inter-bubble device 30 through known network bubbles 29c and 27a and also by the set of two serially connected network control points 24 positioned between private virtual backbone 21 and virtual backbone 20. As depicted in FIG. 5, inter-bubble device 30 may interconnect a plurality of bubble instances 27a and 29c, including bubble instance 28c that is connected directly to instance-specific virtual backbone 22.

Although an instance-specific virtual backbone may exist for either a private or non-private virtual backbone, an instance-specific virtual backbone may not be both private and non-private (local or global) at the same time. In FIG. 5, private instance-specific virtual backbone 22 and non-private instance-specific virtual backbone 23 maintain independence from each other across the inter-bubble device 30.

The foregoing detailed description of the present invention is provided for purposes of illustration and is not intended to be exhaustive or to limit the invention to the precise embodiment disclosed. Accordingly, the scope of the present invention is defined by the following claims.

What is claimed is:

1. A network system configured to carry data, comprising:
   a plurality of network bubbles including both a plurality of known and unknown network bubbles, each of said plurality of network bubbles including both a bubble member configured to transmit and receive data and a network security policy;
   a plurality of network control points, each network control point including at least one network control point device, wherein each of said plurality of network control points is connected to at least one of said plurality of network bubbles, and wherein one of the at least one network control point devices is configured to enforce the network security policy of the at least one of the plurality of network bubbles that is connected to the one of the at least one network control point devices;
   a virtual backbone including a network configured to connect said plurality of network control points connected to ones of said plurality of known and unknown network bubbles;
   a private virtual backbone including a network configured to only connect ones of said plurality of network control points connected to ones of said plurality of known network bubbles, wherein the private virtual backbone includes a registry of local addresses identifying associated bubble members of the plurality of known network bubbles connected to the private virtual backbone; and
   a connecting device configured to interconnect said private virtual backbone and said virtual backbone, wherein said connecting device is at least one of a group comprising of an inter-bubble device or a set of two serially-connected network control points, and the connecting device separates a local address space of the local addresses from a global address space of the virtual backbone, and the connecting device is configured to convert global addresses of the global address space to local addresses of the local address space and vice versa using the registry of local addresses.

2. The network system of claim 1, wherein both said virtual backbone and said private virtual backbone are implemented using any one or more of the group comprising of an internet service provider (ISP), a virtual private network (VPN), an asynchronous transfer mode (ATM), and any other wired or wireless network utilizing a T1 line, a DS3 line, an OC-3 line, or other transmission protocol.

3. The network system of claim 1, wherein said virtual backbone has address registries configured to store local and global address ranges of said plurality of known network bubbles connected to said virtual backbone or said private virtual backbone, and the address registry for the virtual private backbone includes the global address ranges of said plurality of known network bubbles.

4. The network system of claim 1, wherein both said virtual backbone and said private virtual backbone do not enforce any network security policy with respect to data transmitted across said virtual backbone or said private virtual backbone.

5. The network system of claim 1, wherein both said virtual backbone and said private virtual backbone are external to said plurality of both known and unknown network bubbles.

6. The network system of claim 1, wherein both said virtual backbone and said private virtual backbone are external to said plurality of network control points.

7. The network system of claim 1, wherein both said virtual backbone and said private virtual backbone are configured to enforce source address integrity through ones of said plurality of network control points.

8. The network system of claim 1, wherein said inter-bubble device acts to relay data from information packets terminating on one side of said inter-bubble device to information packets initiating on another side of said inter-bubble device.

9. The network system of claim 1, wherein said connecting device comprises means for translating between local address and global address information.

10. The network system of claim 1, wherein said inter-bubble device is implemented using any one or more of the group comprising of a web-caching proxy, an SMTP email relay, a SOCKS server, a citrix server, an SSL, a VPN, an SIP gateway, or a remote access gateway.

11. A network system configured to carry data, comprising:
    a plurality of network bubbles including both a plurality of known and unknown network bubbles, each of said plurality of network bubbles including a network bubble partition and a network security policy, said network bubble partition including at least one bubble member configured to transmit and receive data;
    a plurality of network control points, each network control point having at least one network control point device, wherein each of the plurality of network control points is connected to at least one of said plurality of network bubbles, and wherein one of the at least one network control point devices is configured to enforce the network security policy of the at least one of the plurality of network bubbles that is connected to the one of the at least one network control point devices;
    a virtual backbone including a network configured to connect said plurality of network control points connected to ones of said plurality of known and unknown network bubbles;
    a private virtual backbone including a network configured to only connect ones of said plurality of network control points connected to ones of said plurality of known network bubbles, wherein the private virtual backbone includes a registry of local addresses identifying associated bubble members of the plurality of known network bubbles connected to the private virtual backbone;
    a connecting device configured to interconnect said private virtual backbone and said virtual backbone, wherein the connecting device separates a local address space of the local addresses from a global address space of the virtual backbone, and the connecting device is configured to convert global addresses of the global address space to local addresses of the local address space and vice versa using the registry of local addresses; and
    an instance-specific virtual backbone including a network configured to only connect a plurality of network bubble partitions from one of said plurality of network bubbles without using one of said plurality of network control points.

12. The network system of claim 11, wherein said private virtual backbone is implemented using any one or more of the group comprising of an internet service provider (ISP), a virtual private network (VPN), an asynchronous transfer mode (ATM), and any other wired or wireless network utilizing a T1 line, a DS3 line, an OC-3 line, or other transmission protocol.

13. The network system of claim 11, wherein the registry of said private virtual backbone is configured to further store global address range of said plurality of known network bubbles connected to said private virtual backbone.

14. The network system of claim 11, wherein said private virtual backbone does not enforce any network security policy with respect to data being transmitted across said private virtual backbone.

15. The network system of claim 11, wherein said private virtual backbone is external to said plurality of the network bubbles.

16. The network system of claim 11, wherein said private virtual backbone is external to said plurality of the network control points.

17. The network system of claim 11, wherein said private virtual backbone is configured to enforce source address integrity through one of said plurality of network control points.

18. The network system of claim 11, wherein said instance-specific virtual backbone is implemented using any one or more of the group comprising of an internet service provider (ISP), a virtual private network (VPN), an asynchronous transfer mode (ATM), and any other wired or wireless network utilizing a T1 line, a DS3 line, an OC-3 line, or other transmission protocol.

19. The network system of claim 11, wherein said instance-specific virtual backbone includes an address registry configured to store an address range of said plurality of known network bubbles connected to said instance-specific virtual backbone.

20. The network system of claim 11, wherein said instance-specific virtual backbone does not enforce any network security policy with respect to data transmitted across said instance-specific virtual backbone.

21. The network system of claim 11, wherein said instance-specific virtual backbone is external to said plurality of network bubbles.

22. A network system configured to carry data, comprising:
a plurality of network bubbles including both a plurality of known and unknown network bubbles, each of said plurality of network bubbles including both a network bubble partition and a network security policy, said network bubble partition including at least one bubble member configured to transmit and receive data;
a plurality of network control points, each network control point having at least one network control point device, wherein each of the plurality of network control points is connected to at least one of said plurality of network bubbles, and wherein one of the at least one network control point devices is configured to enforce the network security policy of the at least one of the plurality of network bubbles that is connected to the one of the at least one network control point devices;
a virtual backbone including a network configured to connect said plurality of network control points connected to ones of said plurality of known and unknown network bubbles;
a private virtual backbone including a network configured to only connect ones of said plurality of network control points connected to ones of said plurality of known network bubbles, wherein the private virtual backbone includes a registry of local addresses identifying associated bubble members of the plurality of known network bubbles connected to the private virtual backbone;
a connecting device configured to interconnect said private virtual backbone and said virtual backbone, wherein said connecting device is one or more of a group comprising of an inter-bubble device or a set of two serially-connected network control points, and the connecting device separates a local address space of the local addresses from a global address space of the virtual backbone, and the connecting device is configured to convert global addresses of the global address space to local addresses of the local address space and vice versa using the registry of local addresses; and
a plurality of instance-specific virtual backbones each including a network configured to only connect a plurality of network bubble partitions from ones of said plurality of network bubbles without using one of said plurality of network control points.

23. The network system of claim 22, wherein said virtual backbone, said private virtual backbone and said plurality of instance-specific virtual backbones are implemented using any one or more of the group comprising of an internet service provider (ISP), a virtual private network (VPN), an asynchronous transfer mode (ATM), and any other wired or wireless network utilizing a T1 line, a DS3 line, an OC-3 line, or other transmission protocol.

24. The network system of claim 22, wherein said virtual backbone, said private virtual backbone and said plurality of instance-specific virtual backbones do not enforce any network security policy with respect to data transmitted across said virtual backbone, said private virtual backbone or said plurality of instance-specific virtual backbones.

25. The network system of claim 22, wherein said virtual backbone, said private virtual backbone and said plurality of instance-specific virtual backbones are external to said plurality of network bubbles.

26. The network system of claim 22, wherein both said virtual backbone and said private virtual backbone are external to said plurality of network control points.

27. The network system of claim 22, wherein both said virtual backbone and said private virtual backbone are configured to enforce source address integrity through ones of said plurality of network control points.

28. The network system of claim 22, wherein said inter-bubble device acts to relay data from information packets terminating on one side of said inter-bubble device to information packets initiating on another side of said inter-bubble device.

29. The network system of claim 22, wherein said inter-bubble device is implemented using any one or more of the group comprising of a web-caching proxy, an SMTP email relay, a SOCKS server, a citrix server, an SSL, a VPN, an SIP gateway, or a remote access gateway.

30. A method for creating a network system, comprising:
connecting a virtual backbone including a network to a first plurality of network bubbles via a corresponding first plurality of network control points, said first plurality of network bubbles including both a first plurality of known and unknown network bubbles, each of said first plurality of network bubbles including at least one network bubble partition;
coupling a private virtual backbone including a network to only a second plurality of known network bubbles via a corresponding second plurality of network control points, each of said second plurality of network bubbles including at least one network bubble partition, wherein the private virtual backbone includes a registry of local addresses identifying associated bubble members of the plurality of known network bubbles connected to the private virtual backbone;

linking an instance-specific virtual backbone directly to a plurality of network bubble partitions from ones of either said first or second plurality of known network bubbles without using one of said plurality of network control points; and interconnecting said virtual backbone to said private virtual backbone via at least one connecting device, and the connecting device separates a local address space of the local addresses from a global address space of the virtual backbone, and the connecting device is configured to convert global addresses of the global address space to local addresses of the local address space and vice versa using the registry of local addresses.

31. The method for creating a network system of claim 30, wherein the interconnecting via the at least one connecting device further comprises using an inter-bubble device as the at least one connecting device, said inter-bubble device relaying data from information packets terminating on one side of said inter-bubble device to information packets initiating on another side of said inter-bubble device.

32. The method for creating a network system of claim 30, wherein the interconnecting via the at least one connecting device further comprises using a set of two serially-connected network control points.

33. The method for creating a network system of claim 30, further comprising forming said connecting device by using any one or more of the group comprising of a web-caching proxy, an SMTP email relay, a SOCKS server, a citrix server, an SSL, a VPN, an SIP gateway, or a remote access gateway.

34. The method for creating a network system of claim 30, further comprising forming said virtual backbone, said private virtual backbone and said instance-specific virtual backbone by using any one or more of the group comprising of an internet service provider (ISP), a virtual private network (VPN), an asynchronous transfer mode (ATM), and any other wired or wireless network utilizing a T1 line, a D53 line, an OC-3 line, or other transmission protocol.

35. A network system configured to carry data, comprising:

a plurality of network bubbles including both a plurality of known and unknown network bubbles, each of said plurality of network bubbles including at least one network bubble partition;

a virtual backbone including a network configured to connect ones of said plurality of known and unknown network bubbles via a corresponding first plurality of network control points;

a private virtual backbone including a network configured to connect only ones of said plurality of known network bubbles via a corresponding second plurality of network control points, wherein the private virtual backbone includes a registry of local addresses identifying associated bubble members of the plurality of known network bubbles connected to the private virtual backbone;

means for interconnecting said private virtual backbone and said virtual backbone, and the means for connecting separates a local address space of the local addresses from a global address space of the virtual backbone, and the means for connecting device is for converting global addresses of the global address space to local addresses of the local address space and vice versa using the registry of local addresses; and a plurality of instance-specific virtual backbones each configured to connect a plurality of network bubble partitions from ones of said plurality of network bubbles without using one of the first or second plurality of network control points.

\* \* \* \* \*